United States Patent [19]
Binder

[11] Patent Number: 6,009,109
[45] Date of Patent: Dec. 28, 1999

[54] PROCESS FOR TRANSMISSION OF DIGITAL APPLICATION DATA

[75] Inventor: Jann Binder, Aspach, Germany

[73] Assignee: Robert Bosch GmbH, Stuttgart, Germany

[21] Appl. No.: 08/607,997

[22] Filed: Mar. 4, 1996

[30]        Foreign Application Priority Data

Mar. 2, 1995 [DE] Germany ............................ 195 07 170

[51] Int. Cl.$^6$ ...................................................... H04J 3/02
[52] U.S. Cl. ............................................................. 370/545
[58] Field of Search ..................................... 370/545, 546,
370/468, 357, 360, 375, 376, 377, 378,
379, 380, 466, 467, 505, 506, 537, 538,
539, 540, 541, 542, 543, 544, 527; 375/286,
219, 293, 294, 340, 338, 339, 344, 351,
355

[56]                    References Cited

U.S. PATENT DOCUMENTS

| | | | |
|---|---|---|---|
| 3,819,853 | 6/1974 | Stein . | |
| 4,538,286 | 8/1985 | McNesby et al. | ...................... 370/545 |
| 4,887,261 | 12/1989 | Roempp | ................................ 370/545 |
| 4,920,545 | 4/1990 | Forsberg et al. . | |
| 5,132,970 | 7/1992 | Urbansky | ............................... 370/545 |
| 5,214,643 | 5/1993 | Mueller et al. | .......................... 370/545 |

FOREIGN PATENT DOCUMENTS

| | | |
|---|---|---|
| 0 274 647 | 7/1988 | European Pat. Off. . |
| 1462579 | 2/1969 | Germany . |
| 4041625A1 | 7/1992 | Germany . |
| 4415288A1 | 11/1995 | Germany . |

OTHER PUBLICATIONS

"Synchrone Multiplexeinrichtungen fuer die untere Netzebene", by S. Glock, J. Schmitz, R–M. Stach, Nachrichtentechnische Berichte, Heft 9, Apr. 1992, pp. 20–29.
Taschenbuch der Telekom Praxis 1994, piblisher B. Seiler, Schiele & Schoen—Berlin, pp. 150–171.
"Information Transmission, Modulation, and Noise", By Mischa Schwartz, United approach to communication systems, Second Edition, pp. 136–137.
"Introduction to Communication Systems", By Ferrel G. Stremler, Second Edition, Addison–Wesley Publishing Company, pp. 122–129.
Patent Abstracts of Japan vol. 004, No. 036 (E–003, Mar. 26, 1980.

*Primary Examiner*—Huy D. Vu
*Attorney, Agent, or Firm*—Michael J. Striker

[57]                    ABSTRACT

The process for transmission of digital application data with a predetermined application data timing signal (T1) includes oversampling the application data signal for transmission of the application data with an independent timing signal (T2) which has a frequency which is greater than, but less than twice, that of the application data timing signal (T1). In order to make expensive timing rate adjustment measures unnecessary, the application data is transmitted with this independent timing signal for data transmission. The recovery of the application data timing signal (T1) at the receiver end can be accomplished without considerable effort or expense. The process includes regenerating the application data timing signal (T1) from the scanned application data signal transmitted at the independent timing signal (T2) on the reception end and subsequently recovering the application data signal with the aid of the regenerated application data timing signal (T1).

39 Claims, 6 Drawing Sheets

FIG. 7a SPECTRUM OF D1

FIG. 7b SPECTRUM OF D1 AFTER SCANNING WITH 1/T2

REPRODUCED SPECTRUM ORDER "-1"

FIG. 8b-2

BASE SPECTRUM ORDER "0"

FIG. 8b-3

REPRODUCED SPECTRUM ORDER- "+1"

FIG. 9

PROCESS FOR TRANSMISSION OF DIGITAL APPLICATION DATA

BACKGROUND OF THE INVENTION

The present invention relates to a process for transmission of digital application data at a predetermined data application rate.

It is known to input application data with a predetermined application data rate into a transmission system which has a variable system rate. Rate or frequency adjusting measures for this purpose are described in ANT Radio Engineering Report, Volume 9, 1992, pp. 20–29 ("Synchronous Multiplexing Devices for the lower Network Level") or pp. 30 to 43 ("Synchronous Conduction Equipment"). Thus, for example, a plesiochronic 140 MBit/s signal is mapped into a C4-container of the synchronous digital hierarchy (SDH) with fitting or adjustment to the system rate of 155.52 MBit/s and formation of a suitable pointer. The pointer shows the data position in the container. At the receiving end the application data are received into the container. The rate adjustment can be performed by a stop multiplexer or a crossmultiplexer.

SUMMARY OF THE INVENTION

It is an object of the present invention to provide an improved method of transmission of digital application data.

According to the invention the application data signal for transmission is oversampled with an independent timing signal which has a frequency greater than the frequency of the application data signal.

The method according to the invention has the advantage that the data transmission is accomplished with an independent timing signal varying from the application data timing signal, without expensive timing adjustment features, such as stop bits, pointer formation and input of the application data in predetermined transmission carriers and corresponding reception measures.

In a preferred embodiment of the invention the application data rate is set at 155.52 Mbit/s while the independent/system rate is set at 226 MBit/s.

A conventional regenerator, which operates with the transmission rate, can increase signal quality using the features according to the invention when signal noise is present during the transmission. The recovery of the application data timing signal is possible without additional hardware expense. Interactive data services (IS), e.g. conventional telecommunications data services and new digital data services, of an ANS system (Access Network System) allow transmission in a digital glass fiber connection system with variable rate, e.g. digital distribution systems known under the Tradename DIAMANT (Pocket book of Telecommunication Practice 1994, publisher, Bernd Seiler, Schiele & Schöhn Press, Berlin, pp. 150 to 171).

Several scanned application signals may be multiplexed in a simple way into a common data flow and, e.g., transmitted over a glass fiber network. The receiver-end regeneration of the application data timing signal is possible without difficulty, also even with signal noise in a portion of the transmission with a conventional regenerator. Data with lower bit value may be replaced without noticeable quality loss by a register signal or mark and/or additional application data.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figures 1, 2:
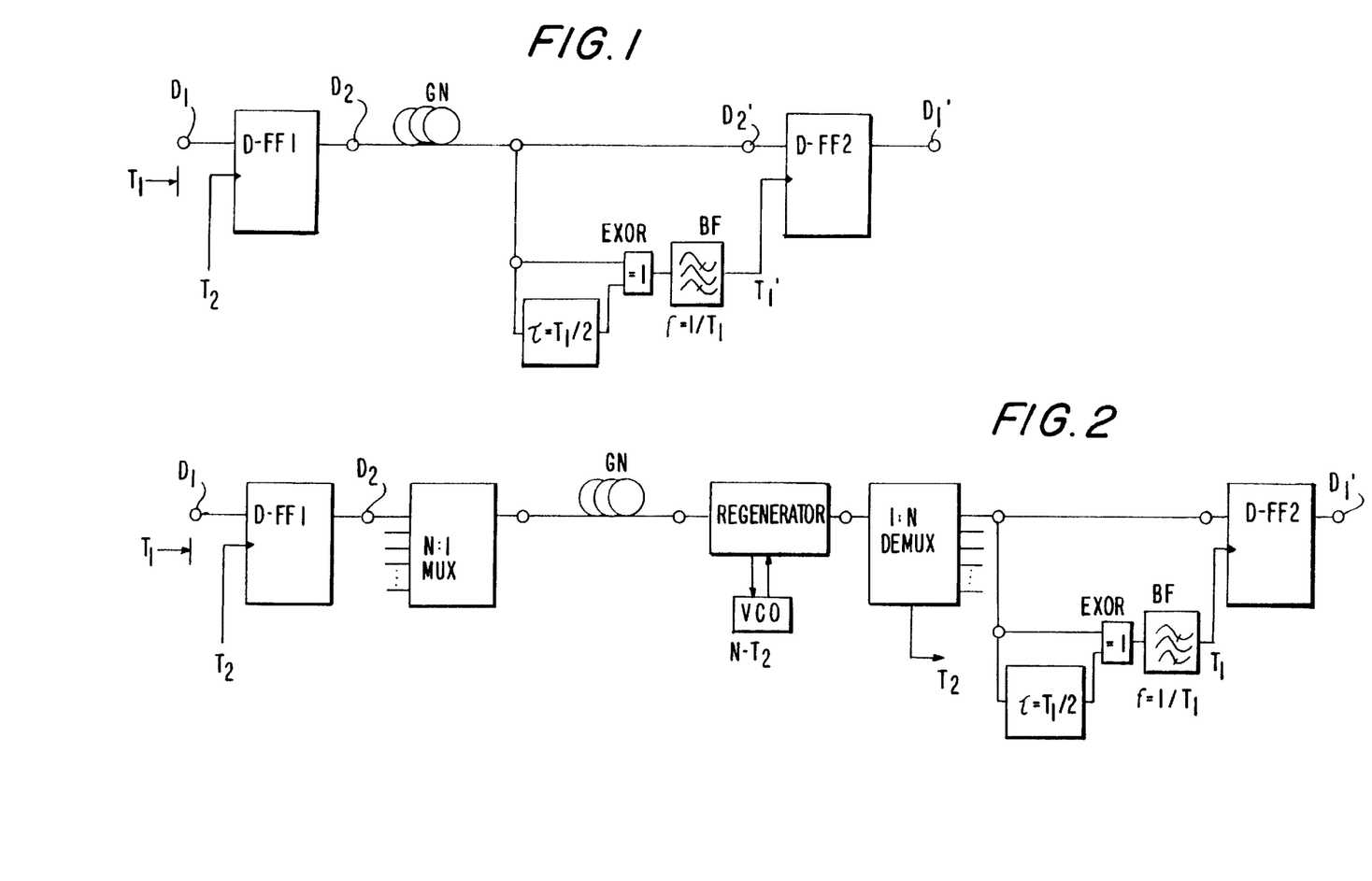
FIG. 1 is a block diagram of one embodiment of the process according to the invention.
FIG. 2 is a block diagram similar to that of FIG. 1 but showing several data flows.

The application data to be transmitted are input into point D1 in the process shown in FIG. 1. The application data timing signal and the duration of its period is indicated with T1. The application data are scanned by means of a D-flip-flop D-FF1 and indeed with an aliquant independent timing signal T2, input to the timing signal input of the D-flip-flop D-FF1. The following condition is required in this scanning: The frequency of the independent timing signal T2 is selected to be larger than the frequency of the application data timing signal. The method is more easily performed in practice, when the independent timing signal T2 and the application timing signal T1 are aliquant, i.e. the ratio of their frequencies (T2 to T1) should be exactly n/k, wherein n and k are whole numbers less than 10 and n is greater than k. Advantageously the system timing rate for the transmission is selected as the independent timing rate T2 or an integer divisor thereof, e.g. 226 MBit/s. The application data rate is, for example, 155.25 MBit/s, particularly, when the application signals transmitted are broadband interactive service, which were transmitted by a feeder network and/or distributing network for digitized TV signals.

The scanned application signal can be transmitted by a glass fiber network GN after suitable electrooptical conversion. At the receiving-side, i.e. at the ends of the glass fiber network GN branched as required, a regeneration of the application data timing signal T1 occurs, which is required for further processing of the application data signal. When the above-described conditions are maintained for the scanning, the regeneration can occur, even with some noise in a portion of the transmission, in a simple way with known regeneration devices. The recovery of the application data timing signal rate is simplified when the frequencies T2 and T1 are aliquant. The peak edges of the application data signal D2' (also at the ends of the portion transmitted) must be less than the difference of the periods T2−T1. This however can be guaranteed easily because the transmitted signal is timely regenerated with a conventional regeneration circuit and the regeneration circuit itself has a rapid-rise output driver circuit. An Exor-logic circuit for recovery of the application timing signal T1 is shown as an example in FIG. 1. This Exor-logic circuit scans the scanned application data signal directly once and also once delayed by a half period T1/2 relative to the application data timing signal T1. A bandpass filter BF is connected to the Exor-logic circuit, whose bandpass is selected so that the recovered application data timing signal T1 appears at its output (average frequency at f=1/T1). A D-flip-flop D-FF2 is controlled with this recovered application data timing signal T1, which regenerates the original application data signal (output D1') unjittered in regard to T1 from the input low-grade transmitted signal thus containing jitter regarding T1.

Figure 3A:
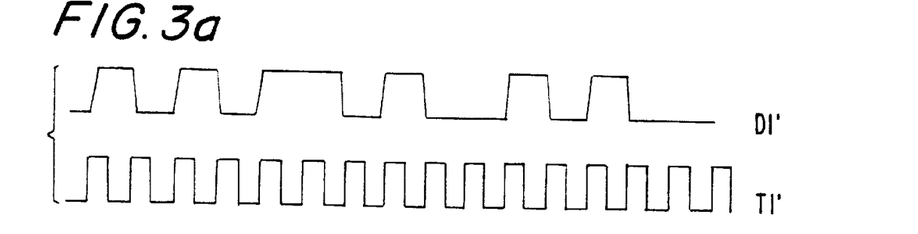
FIGS. 3a) b) and c) are graphical illustrations of an application data signal with scanned time points from the application data timing signal and the independent timing signal.
Figure 3B:
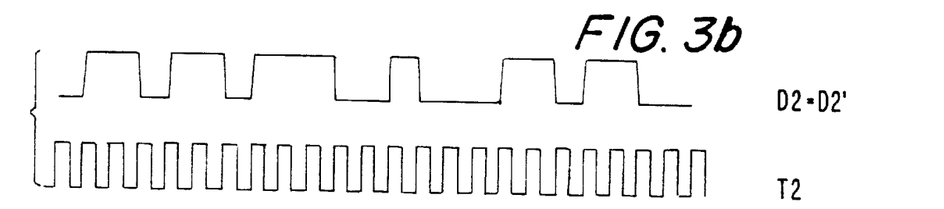
Figure 3C:
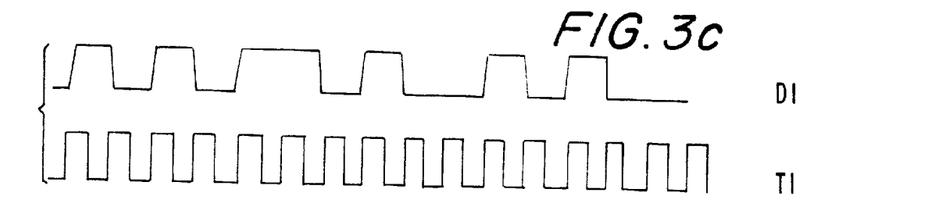

Three different timing information signals are present during the scanning in the scanning section: T2, T1 and T2−T1. FIG. 3a shows a data application signal D1. The frequency of the timing signal T1 of 155.52 MHz is shown directly under the signal D1. A new bit of the data signal D1 begins at each positive pulse edge of the timing signal T1. FIG. 3b shows the system application data signal T2. The scanning points for the timing signal D1 relative to the timing signal T2 are marked on the pulse train D1. One sees that many bits are scanned one time, others multiple times. The result of this scanning is the data signal D2 with the data rate according to T2 in FIG. 3b. However the timing information T1 is present in the signal D2 besides the timing information T2, This can, e.g., be recovered with the previously mentioned Exor-circuit and a filter. The recovered timing signal T1' is indicated in FIG. 3c. The D-FF2-flip-flop of FIG. 1 or 2 receives the amplitude at the positive pulse edges of the data signal D2 in FIG. 3b. The corresponding scanning time points are indicated in FIG. 3b. The result is the recovered application data signal D1', which is only delayed relative to the input signal D1.

Figure 4:
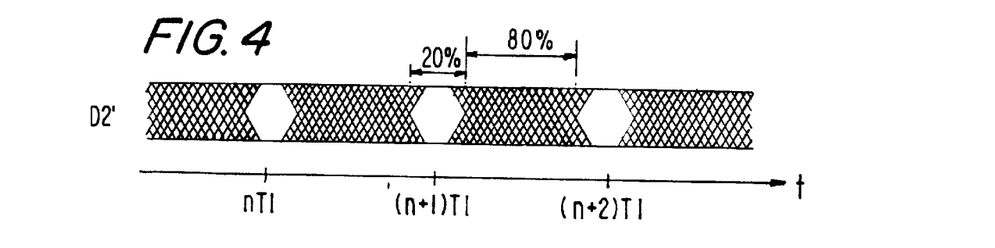
FIG. 4 is an eye diagram of the transmitted application signal, plotted by multiples of the transmission-end timing period T1.
Figure 5:
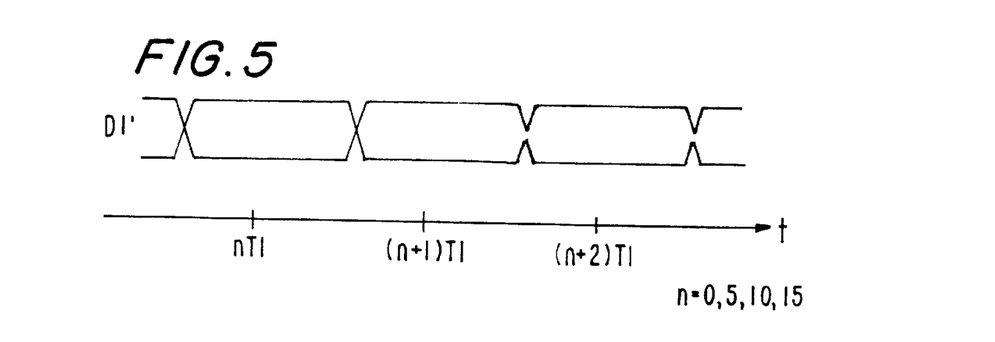
FIG. 5 is a diagram of the reception-side regenerated timing signal.

FIG. 4 shows the jitter-effect eye at the input of the D-flip-flop D-FF2. The jitter arises virtually because the signal D2' is synchronized at the timing rate T1. A prerequisite for an open eye inspite of jitter is a sufficiently steep pulse edge for the application data signal D2'. This can be achieved without problems by suitable electronic devices; particularly also in the case of FIG. 2, since the data rate in the transmission is a multiple of D2. The signal at the output of the D-flip-flop D-FF2 is shown after the scanning at the timing rate T1' in FIG. 5.

FIG. 2 shows an additional embodiment of the method shown in FIG. 1. Here several scanned application data signals are multiplexed at a common data flow rate in contrast to the situation in FIG. 1. Several application data signals scanned by means of D-flip-flop are fed to a N:1-multiplexer MUX and transmitted in a common data flow. N is here an integral multiple of the transmission timing signal T2. Thus for example at a transmission rate in a transmission system of 5.46 GBit/s N=24 at the above-mentioned timing rate. A regenerator for the timing rate N×T2, in this case for the 5.46 GBit/s-transmission timing signal of the data flow, is located upstream of a receiver-side 1:N-demultiplexer DMUX in the embodiment according to FIG. 2. Jitter which arises during the transmission is eliminated with this conventional regenerator. The regenerator and subsequent demultiplexer guarantee rapid rise or steep pulse edges for the output signal as required above. Thus this configuration is very suitable for transmission of application data with reduced scanning. The further processing at the demultiplexer DMUX can accordingly occur as in FIG. 1.

Figure 6:
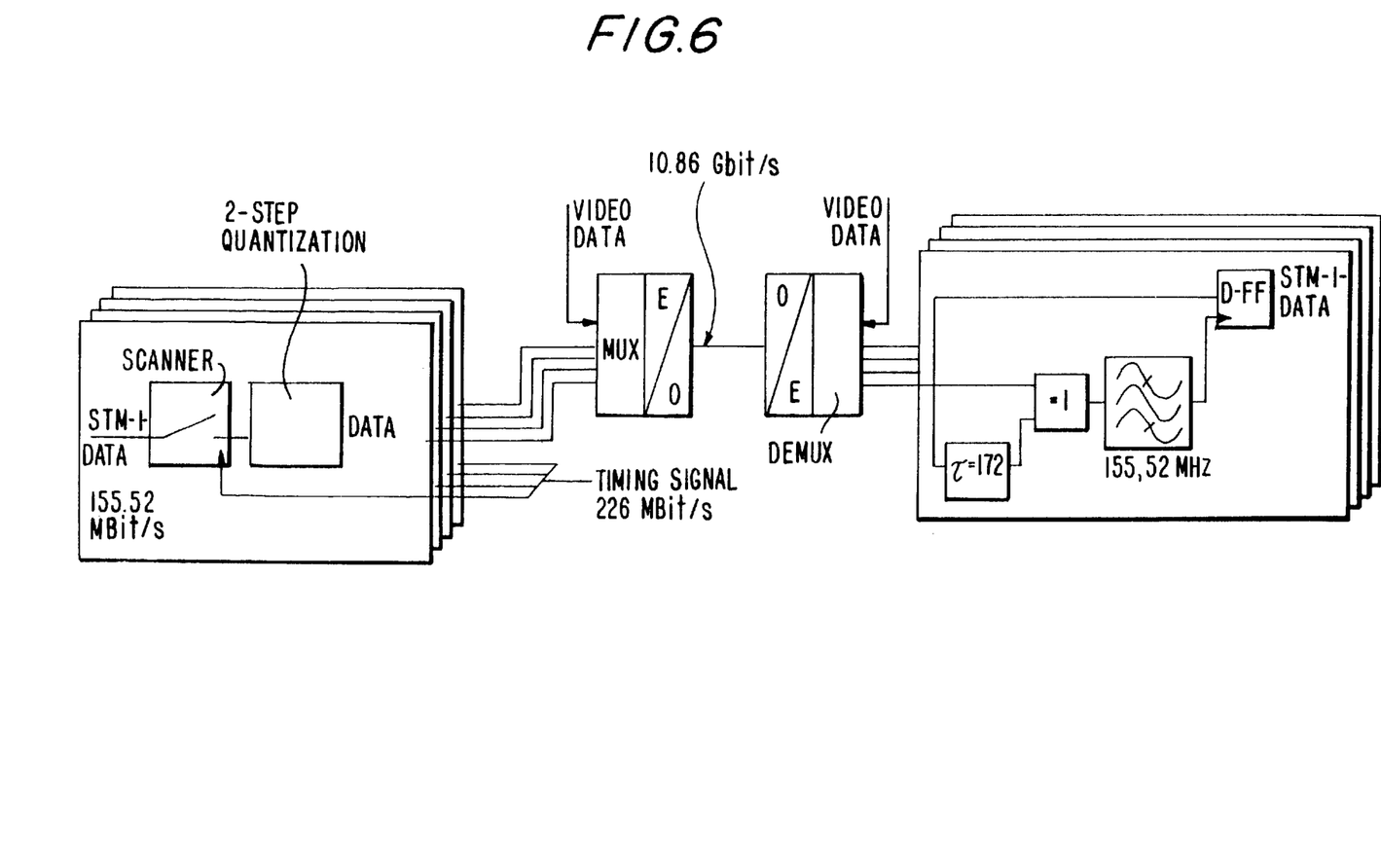
FIG. 6 is an illustration showing the principle of transmission of STM-1 data in a video signal distribution system.

FIG. 6 shows the principle of transmission of STM-1 data, e.g. of an ANS system (Access Network System). The STM-1 data can be interactive (IS) data transmitted by a distribution net for video data with other transmission timing signals, e.g. the above described DIAMANT system. The scanning rate for the STM-1 data is indicated here with CDB. The timing rate of the CDB can e.g. be 226 MHz. After the scanner a two-step quantization is sufficient.

Because of the above-mentioned increase in signal quality during regeneration and the fact that the application data are normally inherently redundant, e.g. video signals, data parts which have a lower bit value—LSB data (lowest significant bit) can be replaced by additional information, such as register marks, without a noticeable impairment in the signal quality. This feature is especially advantageous and can be realized without additional expense, if the data parts from which the application data signal is assembled, are arranged in any case according to bit value, e.g. when analog picture signals are subjected to an analog-to-digital conversion, the output bits flow in parallel and in any case are arranged according to bit values. More detailed regarding the replacement of the lower value data parts is contained in German Patent Application P 44 15 288.4.

The basis for the presence of the timing signal T1 in the data signal D2 and/or D2' is illustrated in detail in the following. The following system data was basic: 30 Mbit/s application data signal, 72 Mhz scanning frequency and 20:1 multiplex at 1.4 Gbit/s transmission rate. It is essential that the transmission rate be asynchronous to the application data rate and stop bits are not necessary for timing adjustment.

Figure 7A:
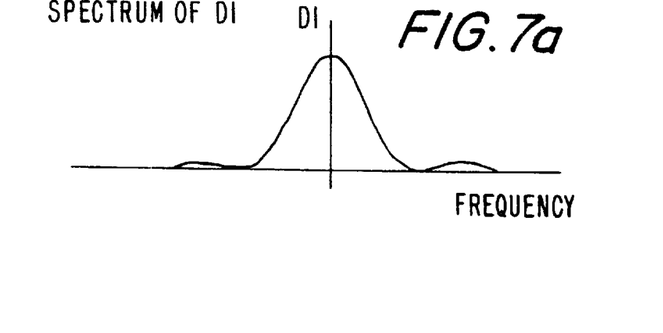
FIG. 7 is a graphical illustration showing the periodic scanning of the spectrum by scanning of the time signal.
Figure 7B:
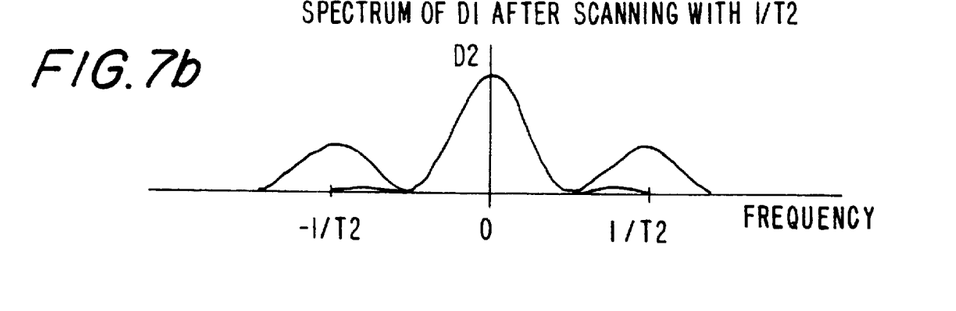

A periodic reproduction of the spectrum of the signal D1 (FIG. 7) arises during scanning of the signal D1 with the timing signal T2 in a spectral band. With the aid of a general analog signal, FIG. 3.21(a), and its spectrum FIG. 3.21(b), the effect of the periodic reproduction is illustrated in FIG. 3.21(f) as taken from the reference Stremler (Introduction to Communication Systems, 2nd Edition, Addison Wesley Publishing Company, Reading, U.S.A., pp. 122–129). The periodically repeated spectrum is evaluated with a curve envelope that depends on the characteristics of the scanner. The first null point of the curve envelope is indicated for example with 3 $w_o$ in Stremler in FIG. 3.21(d) and FIG. 3.21(f). The periodically repeated spectral components are only the same size as the basic spectrum in the scanning with an ideal Dirac pulse.

The system according to FIG. 1 does not operate with an ideal scanner but with a flip-flop D-FF1 with a scanning or reading frequency of 1/T2. A flip-flop behaves like an S/H (sample and hold)-component with digital signals. The reproduced spectra are centered about . . . −1/T2, 0, 1/T2, 2/T2 . . . (FIG. 7) because of the scanning frequency. Furthermore a null position arises at 1/T2 because of the S/H-function, whereby the reproduced spectra are reduced in their amplitude.

Figure 8A:
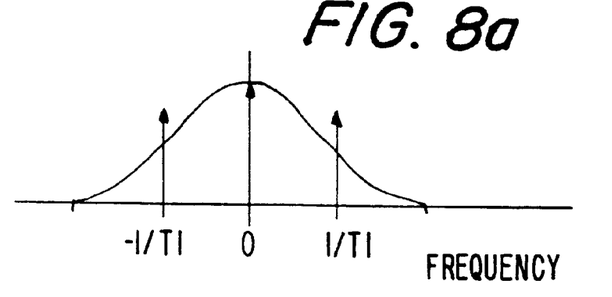
FIGS. 8a), b) and c) are graphical illustrations showing the spectrum of the signals after timing signal recovery.
Figure 8B:
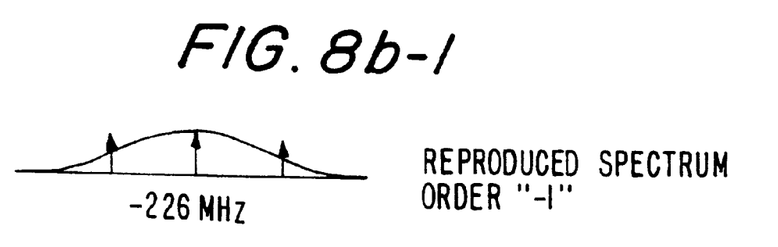
Figure 8B:
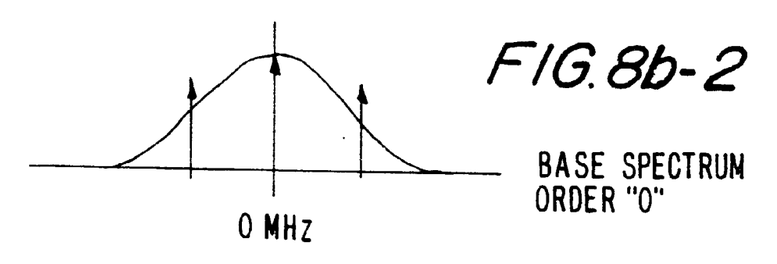
Figure 8B:
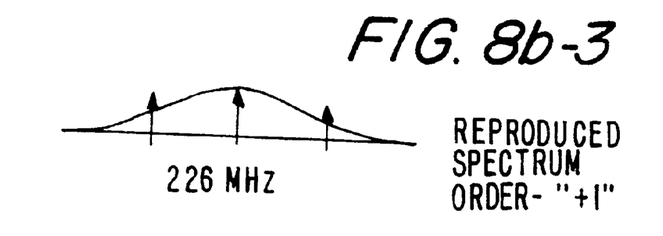
Figure 8C:
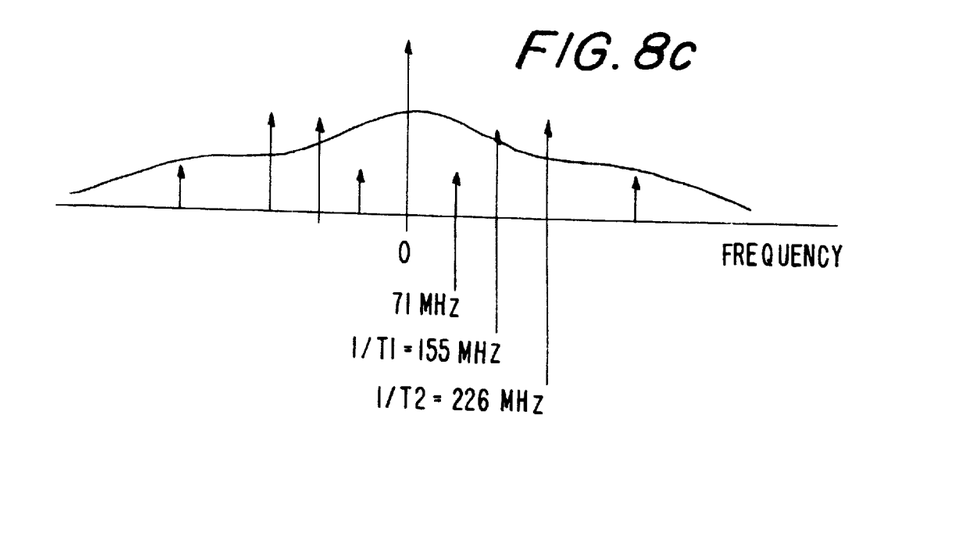

The entire information content of the data signal D1 is still present in the principle spectrum of the data signal D2 and the frequency f=0. Because of that it must also be possible to produce the timing signal T1 from the spectrum of the signal D2 with a timing signal recovery circuit. The output spectra after the EXOR-function is outlined or sketched in FIGS. 8a, 8b and 8c, in the case of FIG. 8a with unchanged signal D1 as input signal of the EXOR-gate and in the case c) with scanned signal D1, which means thus, for signal D2 as input signal of the EXOR-logic gate. Additional timing lines arise in the case of FIG. 8(c). As expected both the line of the scanning frequency 1/T2 (226 MHz) is present, however also the line 1/T1 (155 Mhz) and the sums and differences (226−155=71 Mhz, etc) of these lines are present. The individual spectra are shown in FIG. 8(b).

Figure 9:
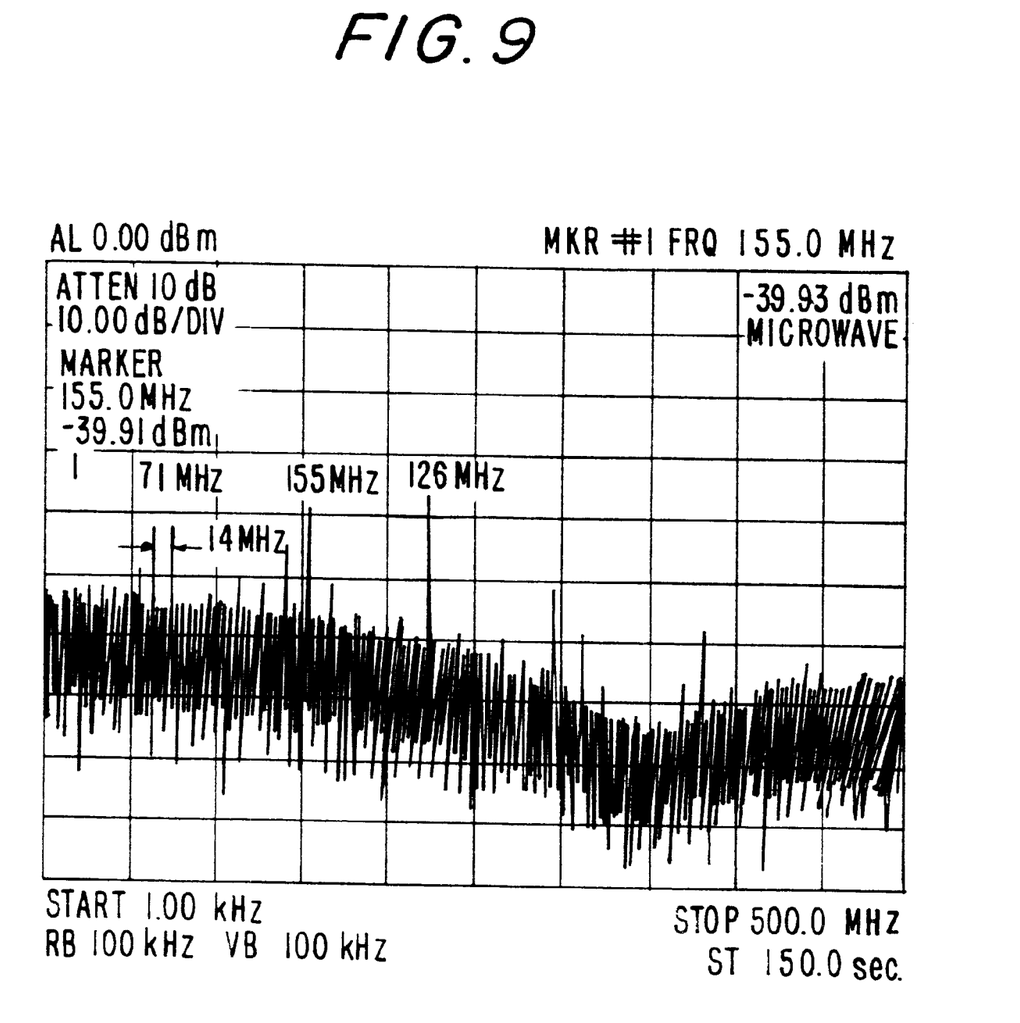
FIG. 9 shows a graphical illustration of a measured signal spectrum.

FIG. 9 shows the result of a measurement of the spectrum at the output of the EXOR-gate for a data signal D1 with 155

Mbit/s, which was scanned by a D-flip-flop with a frequency of 226 Mhz. The differential conductor length for the signals at both inputs of the EXORS was 60 cm corresponding to about 2.8 nsec timing delay. The experimental setup corresponds to the circuit shown in FIG. 1. In addition to the different timing lines a null position is observable in the spectrum, which results for the length of the delay T (FIG. 2) at the frequency 1/τ. The desired timing line of the original data signal D1 is to be detected clearly at the timing frequency 1/T1=155 Mhz. It can be filtered out from the spectrum by a conventional timing filter with a bandpass of 155 Mhz.

While the invention has been illustrated and described as embodied in a process for transmission of digital application data, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

I claim:

1. A process for transmission of digital application data with a predetermined application data timing signal T1, said process comprising the steps of:
   a) oversampling an application data signal with an independent timing signal T2 for transmission of said digital application data, said independent timing signal T2 having a frequency greater than a timing frequency of the application data timing signal T1, but less than twice said timing frequency of said application data timing signal T1;
   b) regenerating the application data timing signal T1 from an oversampled transmitted application data signal prepared according to step a) with said independent timing signal T2;
   c) feeding said oversampled transmitted application data signal and another data signal equal to said oversampled transmitted application data signal but delayed by about a half period of the application data timing signal T1 to a digital timing signal regeneration circuit device to form a resulting signal for regeneration of said application data timing signal T1; and
   d) filtering the resulting signal with a bandpass filter BF having a bandpass in the vicinity of said application data timing signal T1 to obtain said application data timing signal.

2. The process as defined in claim 1, wherein said independent timing signal T2 is aliquant to said application data timing signal T1.

3. The process as defined in claim 1, further comprising multiplexing a plurality of scanned transmitted application signals to form a common data flow.

4. The process as defined in claim 1, wherein said independent timing signal T2 is used as a system timing signal of a transmission network.

5. The process as defined in claim 1, further comprising multiplexing the application data combined with other data according to scanning principles, said other data being synchronized with a system timing signal to form a common data flow with the system timing signal N×T2.

6. The process as defined in claim 1, further comprising replacing data parts of the digital application data having a lower bit value with at least one of a register signal and additional application data.

7. The process as defined in claim 1, wherein a rate of the application data timing signal T1 is 155.52 Mbit/s and a rate of the independent data timing signal T2 is 226 MBit/s.

8. The process as defined in claim 7, wherein said rate of the independent data timing signal T2 is equal to a system timing signal rate.

9. The process as defined in claim 3, wherein said common data flow is at a transmission rate of 5.46 GBit/s.

10. The process as defined in claim 3, wherein said common data flow is at a transmission rate equal to an integral multiple of 5.46 GBit/s.

11. The process as defined in claim 1, further comprising performing said oversampling and said regenerating in a digital optical input and/or distribution system.

12. The process as defined in claim 11, wherein said digital optical input and/or distribution system is a television system.

13. The process as defined in claim 11, wherein said digital optical input and/or distribution system is a radio system.

14. The method as defined in claim 11, wherein said digital optical input and/or distribution system is an interactive data service.

15. A process for transmission of digital application data with a predetermined application data timing signal T1, said process comprising the steps of:
   a) oversampling an application data signal with an independent timing signal T2 for transmission of said digital application data, said independent timing signal T2 having a frequency greater than a timing frequency of the application data timing signal T1, but less than twice said timing frequency of said application data timing signal T1;
   b) regenerating the application data timing signal T1 from an oversampled transmitted application data signal prepared according to step a) with a system timing signal N×T2;
   c) feeding said oversampled transmitted application data signal and another data signal equal to said oversampled transmitted application data signal but delayed by about a half period of the application data timing signal T1 to a digital timing signal regeneration circuit device to form a resulting signal for regeneration of said application data timing signal T1; and
   d) filtering the resulting signal with a bandpass filter BF having a bandpass in the vicinity of said application data timing signal T1 to obtain said application data timing signal.

16. The process as defined in claim 15, wherein said independent timing signal T2 is aliquant to said application data timing signal T1.

17. The process as defined in claim 15, further comprising multiplexing a plurality of scanned transmitted application signals to form a common data flow.

18. The process as defined in claim 15, wherein said independent timing signal T2 is used as a system timing signal of a transmission network.

19. The process as defined in claim 15, further comprising multiplexing the application data combined with other data according to scanning principles, said other data being synchronized with a system timing signal to form a common data flow with the system timing signal N×T2.

20. The process as defined in claim 15, further comprising replacing data parts of the digital application data having a lower bit value with at least one of a register signal and additional application data.

21. The process as defined in claim 15, wherein a rate of the application data timing signal T1 is 155.52 Mbit/s and a rate of the independent data timing signal T2 is 226 MBit/s.

22. The process as defined in claim 21, wherein said rate of the independent data timing signal T2 is equal to a rate of the system timing signal.

23. The process as defined in claim 17, wherein said common data flow is at a transmission rate of 5.46 GBit/s.

24. The process as defined in claim 17, wherein said common data flow is at a transmission rate equal to an integral multiple of 5.46 GBit/s.

25. The process as defined in claim 15, further comprising performing said oversampling and said regenerating in a digital optical input and/or distribution system.

26. The process as defined in claim 25, wherein said digital optical input and/or distribution system is a television system.

27. The process as defined in claim 25, wherein said digital optical input and/or distribution system is a radio system.

28. The process as defined in claim 25, wherein said digital optical input and/or distribution system is an interactive data service.

29. A process for transmission of digital application data with a predetermined application data timing signal T1, said process comprising the steps of:

a) scanning a plurality of application data signals with an independent timing signal T2 for transmission of said digital application data, said independent timing signal T2 having a frequency greater than a timing frequency of the application data timing signal T1, but less than twice said timing frequency of said application data timing signal T1, to form a plurality of scanned application data signals;

b) multiplexing the scanned application data signals to form a multiplexed scanned application data signal and transmitting the multiplexed scanned application data signal;

c) receiving and demultiplexing the multiplexed scanned application data signal to retrieve the scanned application data signals;

d) regenerating the application data timing signal T1 from the respective scanned application data signals retrieved in step c) and other data signals equal to the respective scanned application data signals retrieved in step c), but delayed by about a half period of the application data timing signal T1, by means of respective digital timing signal regeneration circuits and bandpass filters BF, each of said bandpass filters having a bandpass in the vicinity of said application data timing signal; and e) recovering the respective application data signals from the respective scanned application data signals with the application data timing signal T1 obtained in step d).

30. The process as defined in claim 29, wherein said independent timing signal T2 is aliquant to said application data timing signal T1.

31. The process as defined in claim 29, wherein said independent timing signal T2 is used as a system timing signal of a transmission network.

32. The process as defined in claim 29, further comprising replacing data parts of the digital application data having a lower bit value with at least one of a register signal and additional application data.

33. The process as defined in claim 29, wherein a rate of the application data timing signal T1 is 155.52 Mbit/s and a rate of the independent data timing signal T2 is 226 MBit/s.

34. The process as defined in claim 33, wherein said rate of the independent data timing signal T2 is equal to a system timing signal rate.

35. The process as defined in claim 29, further comprising performing said scanning and said regenerating in a digital optical input and/or distribution system.

36. The process as defined in claim 35, wherein said digital optical input and/or distribution system is an interactive data service.

37. The process as defined in claim 35, wherein said digital optical input and/or distribution system is a radio system.

38. The process as defined in claim 35, wherein said digital optical input and/or distribution system is a television system.

39. An apparatus for transmission of digital application data with a predetermined application data timing signal T1, said apparatus comprising:

means for scanning a plurality of application data signals with an independent timing signal T2 for transmission of said digital application data, said independent timing signal T2 having a frequency greater than a timing frequency of the application data timing signal T1, but less than twice said timing frequency of said application data timing signal T1, to form a plurality of scanned application data signals;

means for multiplexing the scanned application data signals to form a multiplexed scanned application data signal and transmitting the multiplexed scanned application data signal;

means for receiving and demultiplexing the multiplexed scanned application data signal to retrieve the scanned application data signals;

means for regenerating the application data timing signal T1 from the respective scanned application data signals and other data signals equal to the respective scanned application data signals, but delayed by about a half period of the application data timing signal T1, by means of respective digital timing signal regeneration circuits and bandpass filters BF, each of said bandpass filters having a bandpass in the vicinity of said application data timing signal; and means for recovering the respective application data signals from the respective scanned application data signals with the application data timing signal T1.

* * * * *